United States Patent [19]

Noma et al.

[11] 4,281,238

[45] Jul. 28, 1981

[54] TUBULAR JACKET HEATER

[75] Inventors: Hideyuki Noma, Ageo; Takaaki Nakano, Omiya, both of Japan

[73] Assignee: Shin-Etsu Polymer Co., Ltd., Japan

[21] Appl. No.: 74,733

[22] Filed: Sep. 12, 1979

[30] Foreign Application Priority Data

Sep. 18, 1978 [JP] Japan ............................ 53-114305

[51] Int. Cl.[3] .............................................. H05B 3/58

[52] U.S. Cl. ............................... 219/535; 174/40 CC; 138/33; 219/211; 219/301; 219/528; 219/530; 219/544; 219/549; 219/541; 338/212; 339/103 C

[58] Field of Search ............... 219/201, 211, 301, 433, 219/456, 528, 530, 535, 538, 540, 541, 544, 545, 549; 138/33, 112; 174/40 CC; 338/212, 214; 339/103 C, 21 S, 61 C

[56] References Cited

U.S. PATENT DOCUMENTS

| | | | |
|---|---|---|---|
| 1,674,488 | 6/1928 | Tang | 219/535 X |
| 1,820,602 | 8/1931 | Dick | 219/535 X |
| 2,331,098 | 10/1943 | White et al. | 174/40 |
| 2,506,574 | 5/1950 | Boydstun | 219/535 |
| 3,125,657 | 3/1964 | Colten | 219/535 |
| 3,231,716 | 1/1966 | Van Den Bosch | 219/433 |
| 3,281,579 | 10/1966 | Glicksman | 219/535 |
| 3,519,023 | 7/1970 | Burns, Sr. et al. | 219/535 X |
| 3,696,233 | 10/1972 | Pulsifer | 219/535 |
| 3,872,281 | 3/1975 | Krieg et al. | 219/535 |
| 3,968,348 | 7/1976 | Stanfield | 219/535 |

*Primary Examiner*—Volodymyr Y. Mayewsky
*Attorney, Agent, or Firm*—Hill, Van Santen, Steadman, Chiara & Simpson

[57] ABSTRACT

A tubular jacket heater having a C-wise radial cross section with an aperture extending in a parallel direction to the axis is proposed which is used to envelop and preheat a tubular lamp used, for example, in a electrophotographic copying machine. The heater is composed of an inner layer made of an electrically insulating rubbery elastomer, an outer layer also made of an electrically insulating rubbery elastomer and a flexible heater element sandwiched by and entending between the inner and the outer insulating layers. The rubbery elastomer recommended is a silicone rubber with a specified hardness.

Different from conventional similar tubular jacket heaters in which the insulating layers are made of a rather rigid plastic resin such as a polycarbonate resin, the inventive heater has an excellent adaptability to the outer surface of the tubular lamp inserted therein so that a greatly improved efficiency of the heater is obtained.

5 Claims, 4 Drawing Figures

TUBULAR JACKET HEATER

BACKGROUND OF THE INVENTION

The present invention relates to a tubular jacket heater or, more particularly, to a tubular jacket heater for preheating tubular lamps employed as a light source in electrophotographic copying machines, facsimile communication apparatuses, microfilm reader-printers and the like.

In various image forming machines such as those named above, one of the important process steps is the exposure of respective photosensitive materials to light from a light source such as a fluorescent lamp, iodine lamp and the like. In order to ensure instantaneous starting of these lamps by turning the switches on and to obtain stabilization of the light intensity during operation, it is desirable that the lamps are kept at a constant temperature not so low even when the machine per se is not in operation and throughout the operation. For example, the optimum temperature for the stabilization of the light intensity in a fluorescent lamp is 40° to 43° C. and, therefore, a preheating means in the lamp is indispensable, especially, in winter.

Accordingly, it is usual that these lamps are provided with a tubular jacket heater with a C-wise radial cross section having an aperture extending in the direction parallel to the axis of the tubular lamp through which light is emitted and the temperature of the lamp is kept constant at the optimum operating temperature by the aid of a thermostat.

These tubular jacket heaters have a structure such that a thin, sheet-like heater element is sandwiched therein. An inner insulating co-act to provide a heater having a C-shape layer and an outer insulating layer. The material for these insulating layers must be selected with consideration of several factors. For example, the material should be sufficiently resistant to heat at a temperature of the surface of the lamp which sometimes reach 120° C. or higher when the lamp is lighted and also fire-resistant even in an electrical accident along with a good workability to be shaped into a tubular form with a C-wise cross section.

In the prior art, the inner insulating layer of the tubular jacket heaters for preheating tubular lamps is made of a polycarbonate resin which satisfies the above requirements, on to which a heater element is bonded by use of an adhesive agent with an outer covering layer made of an insulating material such as glass cloth.

The above described tubular jacket heater with an insulating layer made of a polycarbonate resin is defective due to the lack of flexibility of the resin leading to an incomplete close contact of the inside surface of the heater and the surface of the lamp so that the heat efficiency of the tubular heater is relatively low. Consequently, the wattage of the heater element must be excessively large and an undesirably long time is taken for the elevation of the temperature from the ambient to the desired optimum preheating temperature of the fluctuation in the temperature of the lamp during operation is unduly large.

SUMMARY OF THE INVENTION

It is therefore an object of the present invention to provide a novel tubular jacket heater for preheating tubular lamps with a high heat efficiency so that the above described drawbacks in the prior art tubular jacket heaters are eliminated.

The tubular jacket heater of the invention having a C-wise radial cross-section with an aperture extending in the direction parallel to the axis thereof comprises (a) an inner layer made of a first electrically insulating rubbery elastomer, (b) an outer layer made of a second electrically insulating rubbery elastomer bonded to the inner layer, and (c) a flexible heater element embedded in said heater and comprising an undulating wire having longer segment portions extending co-axially of the layers and with shorter connecting segment portions extending generally circumferentially of the layers.

DETAILED DESCRIPTION OF THE PREFERRED EMBODIMENTS

Figure 1:
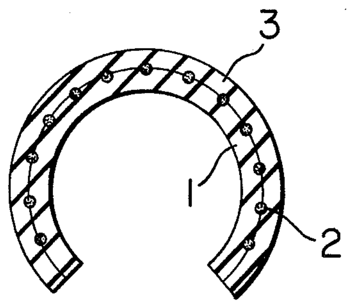
FIG. 1 is a radial cross sectional view of the inventive tubular jacket heater.

The tubular jacket heater of the present invention is now illustrated with reference to the drawing annexed.

In FIG. 1 showing the C-wise cross sectional view of the tubular jacket heater, 1 is an inner layer made of an electrically insulating rubbery elastomer, 3 is an outer layer made also of an electrically insulating rubbery elastomer bonded to the inner insulating layer 1 and 2 is a flexible heater element embedded in the jacket and comprising an undulating wire having longer segment portions extending co-axially of the layers and with shorter connecting segment portions extending generally circumferentially of the layers. As is understood from FIGS. 1 and 2, the tubular jacket heater has a cross section something like a letter C with an aperture extending in the direction parallel to the axis of the tubular jacket heater. A tubular lamp is fitted inside the tubular jacket heater by being inserted through the aperature to be in close contact with the inner surface of the tubular jacket heater and emits light through the aperture. Thus the inner diameter of the tubular jacket heater should be equal to or slightly smaller than the outer diameter of the tubular lamp to be enveloped by the tubular jacket heater in close contact and the width of the aperture should be large enough so as to ensure a sufficient light dose for the exposure of the photosensitive material used in respective machines.

When the tubular lamp is inserted into the tubular jacket heater of the invention, advantages are obtained by the close and tight contact of the tubular lamp and the inner surface of the tubular jacket heater by the elastic adaptability of the rubbery elastomer of the inner layer 1 with the aid of the pressure exerted by the elastic resilience of the outer layer 3 made of a rubbery elastomer.

The rubbery elastomers for the inner and the outer insulating layers 1 and 3 are not limited to particular types of rubbers including natural rubber and various kinds of synthetic rubbers. It is recommended, however, that these layers 1 and 3 are made of silicone rubbers in consideration of several of the requirements for the material such as heat resistance, flame retardancy, anti-ozone resistance, thermal conductivity, anti-chemicals resistance and others.

The materials, e.g. silicone rubbers, for the inner layer 1 and the outer layer 3 can be the same but it is sometimes advantageous to use differenct silicone rubbers in respect to hardness. This is because that the primary requirement for the inner layer 1 is that the silicone rubber has a relatively low hardness in order to ensure good and closest contact with the outer surface of the tubular lamp so as that the heat conduction from the heater to the lamp is as good as possible. In this connection, the hardness of the silicone rubber for the inner layer is in the range from 20 to 80, or, preferably, from 40 to 70, as cured by the scale defined in JIS K 6301. It should be noted, however, a silicone rubber with a hardness lower than 20 is not recommendable due to the increased difficulty in the shaping of the rubber composition into tubular form.

On the other hand, the hardness of the silicone rubber for the outer layer 3 is desirably not lower than that of the silicone rubber for the inner layer 1. For example, the hardness of the rubber for the outer layer is larger than that for the inner layer at least by 10 in the JIS scale. This is because the outer layer if required to exert a pressure to the inner layer by the elastic resilience so as to increase the adaptability of the inner layer 1 with the tubular lamp inserted into the tubular jacket heater.

A particularly desirable property for the silicone rubber of the inner layer 1 is the good thermal conductivity so as to increase the heat efficiency of the tubular jacket heater by the increased heat conduction to the tubular lamp. In this connection, the silicone rubber for the inner layer 1 is formulated to include considerable amounts of one or more of inorganic fillers which contribute to enhance the thermal conductivity of the rubbers such as iron oxide, zinc oxide, hydrated alumina, pulverized quartz, amorphous silica, aluminum silicate, talc, titanium boride, graphite, metals and the like, needless to say, taking into consideration that the electric insulation of the resultant rubbers is not adversely affected. The amount of such an inorganic filler is usually in the range from 20 to 200 parts by weight per 100 parts by weight of the rubber polymer, i.e. the organopolysiloxane in the case of silicone rubbers because smaller amounts than above can give insufficient effects for improving the thermal conductivity while larger amounts than above are undesirable due to the increased hardness and brittleness of the cured silicone rubbers.

The silicone rubber for the outer insulating layer 3 is also desired to have a good thermal conductivity since heat is produced in the tubular lamp when the lamp is lighted so as that the heat must be eliminated efficiently through the tubular jacket heater. In this regard, the thickness of the inner and the outer insulating layers 1 and 3 should be as small as possible to ensure good thermal conduction provided that sufficient mechanical strengths and good electric insulation can be obtained. It is usual that the thickness of the inner and the outer insulating layers 1 and 3 is each in the range from about 0.3 mm to about 2 mm.

Figure 2:
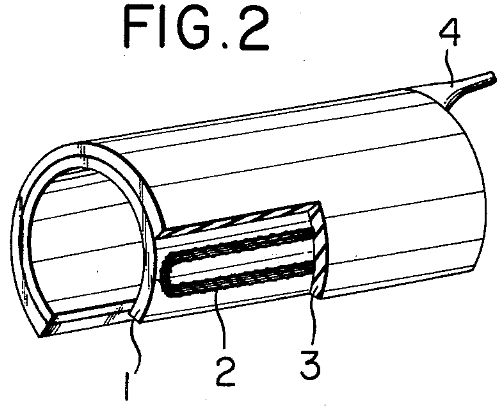
FIG. 2 is a perspective view of the inventive tubular jacket heater partly broken to show the heater element embedded between the inner and the outer insulating layers.

The flexible heater element 2 to be embedded and extending between the inner and the outer insulating layers 1 and 3 and connected to the lead wires 4 is not limited to a particular type provided that it is sufficiently thin and flat so as not to impair the flatness or smoothness of the surfaces of the tubular jacket heater, especially, at the inner surface thereof since a closest contact of the inner surface of the tubular jacket heater and the outer surface of the tubular lamp is an essential requirement. For example, the flexible heater element 2 may be a thin foil or sheet of stainless steel or an electroconductive silicone rubber suitably etched or cut to be imparted with an appropriate electric resistivity for the desired wattage of the heater element. Alternatively, it may be a thin coiled heater element of nichrome wire wound around a bundle or roving of glass filaments and running zig-zag between the inner and the outer insulating layers 1 and 3 as is seen in FIG. 2 where the outer insulating layer 3 is partly cut and removed to show the flexible heater element 2. A thin ribbon of a metal or a woven or non-woven fabric of an electroconductive fibrous material, e.g. carbon fibers, may also be used as the flexible heater element 2.

Figure 3:
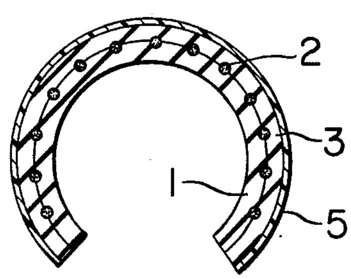
FIG. 3 is a radial cross sectional view of the inventive tubular jacket heater with an outermost reinforcing layer.
Figure 4:
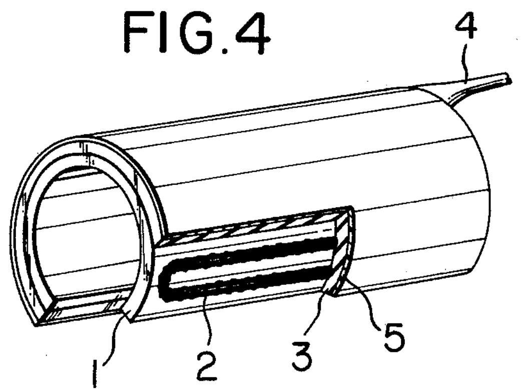
FIG. 4 is a perspective view of the inventive tubular jacket heater as shown in FIG. 3 partly broken to show the heater element.

When an increased rigidity of the tubular jacket heater is required, it is optional that the heater is provided with an outermost reinforcing layer 5 which is a film of a plastic resin of 50 to 200 $\mu m$ thickness and integrally bonded to the outer insulating layer 3, for example, with an adhesive as is shown in FIGS. 3 and 4. The material for the reinforcing layer 5 should have a desired rigidity and moderate heat resistance and is exemplified by relatively flexible polyimide resins, polyamideimide resins, polyester resins, aromatic nylons, glass cloths and the like.

In the next place, the procedure for manufacturing the tubular jacket heater of the invention is described.

A sheet of an uncured rubber composition is cut into a suitable shape to form the outer insulating layer 3 and a sheet of an incured rubber composition is overlaid thereon to form the inner insulating layer 1 with the flexible heater element 2 sandwiched therebetween. Thus overlaid sheets of the rubber compositions are then wound around a core mandrel with a diameter equal to or slightly smaller than the diameter of the tubular lamp leaving the surface portion of the core mandrel bare corresponding to the aperture of the finished tubular jacket heater and fastened to be secured around the core mandrel by winding a tape of a heat resistant material such as a polyester film or a glass cloth. The rubber sheets thus fastened around the core mandrel are heated as such to effect curing of the rubber compositions followed by pulling out the core mandrel to give the tubular jacket heater with an aperture. It is optional to trim the edges of the inner and the outer layers along the aperture to obtain the required width of the aperture.

By the curing of the rubber sheets as fastened around the core mandrel, the inner and the outer layers are firmly bonded. If necessary, a primer is used to improve the adhesion of the inner or outer rubber layer and the flexible heater element to be embedded between the inner and the outer layers. When the flexible heater element is a sheet of an electroconductive silicone rubber, it is of course optional that a sheet of the electroconductive silicone rubber composition is sandwiched as uncured between the uncured insulating silicone rubber sheets and is wound and fastened around the core mandrel as a three-layer laminate which is subjected to curing with simultaneous bonding of the layers.

As is understood from the above description, the tubular jacket heater of the present invention has advantages in several aspects. For example, the heater has an appropriate flexibility or elasticity so that the tubular lamp can be fitted therein with case and closest contact is obtained between the inner surface of the tubular jacket heater and and outer surface of tubular lamp to give remarkably improved heat efficiency with, consequently, smaller wattage of the heater element and shorter time for temperature elevation as well as smaller temperature fluctuation.

Following is an example to illustrate the manufacture of the inventive tubular jacket heater and the improved efficiency thereof in comparison with a conventional tubular jacket heater.

EXAMPLE

A curable silicone rubber composition was prepared by blending 100 parts by weight of a silicone rubber compound containing a finely divided silica filler (KE 151U, a product by Shin-Etsu Chemical Co., Japan), 1.5 parts by weight of a curing agent (C-2, a product of the same company) and 4 parts by weight of a coloring agent (KE Color BR, a product of the same company).

The silicone rubber composition was fabricated into a sheet of 1 mm thickness of the technique of topping on to a film of polyimide resin of 0.125 mm thickness having a surface treated in advance with a primer (Primer No. 8, a product of Shin-Etsu Chemical Co.). The sheet was cut into a piece of 370 mm length and 65 mm width and a heater element made of a stainless steel foil of 30 μm thickness etched to have a wattage of 20 watts and treated with the primer was laid on the sheet of the silicone rubber composition. Further, a sheet of the same silicone rubber composition of 1 mm thickness as cut into a piece of 370 mm length and 60 mm width was overlaid on the heater element to form a laminate.

The thus laminated silicone rubber sheets were wound around a core mandrel of 400 mm length and 24 mm outer diameter with the sheet with the narrower width, i.e. 60 mm, facing inside so as that the longer sides of the rubber sheets and the axis of the core mandrel were in a parallel direction. Thereupon, a tape of a polyester film was wound around over the laminated sheets on the outermost layer of the polyimide resin film so as to fasten and secure the laminate around and on the core mandrel.

The laminate of the silicone rubber composition as fastened and secured around the core mandrel was put into an air oven at 200° C. and kept there for 1 hour to be cured with simultaneous integral bonding of the rubber sheets followed by pulling out the core mandrel and post-curing at 200° C. for 5 hours to give a tubular jacket heater of the invention having an inner diameter of 24 mm, a length of 370 mm and an aperture with a width of 15 mm by suitably trimming the edges.

The performance of the above prepared tubular jacket heater was compared with that of a conventional tubular jacket heater of approximately the same dimensions but with the insulating layers each of 0.8 mm thickness made of a polycarbonate resin and an increased wattage of the heater element of 40 watts. Into each of the tubular jacket heaters was inserted a fluorescent lamp of 27 mm outer diameter and 450 mm length and the temperature at the interface between the inner surface of the tubular jacket heater and the outer surface of the lamp was measured with a thermocouple. When the ambient temperature was 10° C., the time taken for the temperature elevation from 10° C. to 40° C. by actuating the heater was 120 seconds for the inventive tubular jacket heater and 180 seconds for the conventional one indicating the much better heat efficiency of the inventive tubular jacket heater.

What is claimed is:

1. A tubular jacket heater for preheating a tubular lamp having an aperture extending in the direction parallel to the axis of the heater to form a C-wise radial cross section comprising (a) an inner layer made of a first electrically insulating rubbery elastomer, (b) an outer layer made of a second electrically insulating rubbery elastomer and bonded to the inner layer, and (c) a flexible heater element embedded in said heater and comprising an undulating wire having longer segment portions extending co-axially of the layers and with shorter connecting segment portions extending generally circumferentially of the layers, the first and the second electrically insulating rubbery elastomers are silicone rubbers, the hardness of the first and the second electrically insulating rubbery elastomers is in the range from 40 and 70 by this JIS scale.

2. The tubular jacket heater as claimed in claim 1 wherein the hardness of the second electrically insulating rubbery elastomer is equal to or larger than the hardness of the first electrically insulating rubbery elastomer.

3. The tubular jacket heater as claimed in claim 1 wherein the flexible heater element is a sheet of an electroconductive silicone rubber integrally bonded to the inner and the outer layers.

4. The tubular jacket heater as claimed in claim 1 wherein each of the inner layer and the outer layer has a thickness in the range from about 0.3 mm to about 2 mm.

5. The tubular jacket heater as claimed in claim 1 wherein the flexible heater element is a nichrome wire wound around a roving of glass filaments and running zig-zag between the inner layer and the outer layer.

* * * * *